(12) United States Patent
Turcan

(10) Patent No.: US 11,898,930 B2
(45) Date of Patent: Feb. 13, 2024

(54) SYSTEMS AND METHODS FOR MEASURING SHAFT-RELATIVE VIBRATION

(71) Applicant: Saudi Arabian Oil Company, Dhahran (SA)

(72) Inventor: Doru Catalin Turcan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/482,547

(22) Filed: Sep. 23, 2021

(65) Prior Publication Data

US 2023/0090096 A1 Mar. 23, 2023

(51) Int. Cl.
*G01M 13/028* (2019.01)
*G06F 17/18* (2006.01)

(52) U.S. Cl.
CPC ........... *G01M 13/028* (2013.01); *G06F 17/18* (2013.01)

(58) Field of Classification Search
CPC .............................. G01M 13/028; G06F 17/18
See application file for complete search history.

(56) References Cited

U.S. PATENT DOCUMENTS

| | | | |
|---|---|---|---|
| 10,168,248 B1* | 1/2019 | Morey | G01M 13/045 |
| 10,337,958 B2* | 7/2019 | Sakaguchi | F16C 19/00 |
| 2002/0014213 A1* | 2/2002 | Fuwa | F02D 13/0253 |
| | | | 123/90.11 |
| 2009/0219030 A1* | 9/2009 | Salem | G01R 31/52 |
| | | | 324/510 |
| 2016/0265335 A1* | 9/2016 | Mauldin | E21B 44/00 |
| 2018/0284758 A1* | 10/2018 | Cella | H04B 17/318 |
| 2021/0270120 A1* | 9/2021 | Hohl | E21B 49/003 |

FOREIGN PATENT DOCUMENTS

| | | |
|---|---|---|
| CN | 105302337 B | 10/2019 |
| JP | 09305127 A | 5/1996 |
| JP | 2008224301 A | 9/2008 |
| JP | 5330008 B2 | 10/2013 |
| JP | 5422314 B2 | 2/2014 |

OTHER PUBLICATIONS

Westphal, "A Short Textbook of Physics Not Involving the Use of Higher Mathematics", 1968, Springer-Verlag New York (Year: 1968).*

* cited by examiner

*Primary Examiner* — Manuel L Barbee
(74) *Attorney, Agent, or Firm* — Dinsmore & Shohl LLP

(57) ABSTRACT

A method for processing vibration data includes receiving shaft displacement data, from a pair of sensors, including shaft center X-axis displacement and shaft center Y-axis displacement, which are orthogonal to each other. The method includes converting the shaft displacement data to shaft velocity data by calculating a difference in shaft displacement over time and/or converting into shaft acceleration data by calculating a different in shaft velocity over time. The shaft velocity or acceleration data is filtered, sorted and grouped into three or more groups, assigning a color to each velocity group or acceleration group. The method generates an image of a velocity or acceleration orbit plot, where the X-axis displacement and the Y-axis displacement define coordinate pairs of a trace of shaft center displacement, and the velocity or acceleration group between each coordinate pair defines a display color of the trace.

15 Claims, 6 Drawing Sheets

SYSTEMS AND METHODS FOR MEASURING SHAFT-RELATIVE VIBRATION

TECHNICAL FIELD

The present specification generally relates to systems and methods for analyzing vibration and, more specifically, systems and methods for collecting and displaying shaft-relative vibration data.

BACKGROUND

Mechanical equipment with rotating parts tends to produce vibration. This vibration may exhibit different characteristics that are indicative of normal operation or possible maintenance issues. Many tools exist for collecting and interpreting vibration data. Typically, this vibration data is collected, analyzed, and displayed in the time domain or the frequency domain. Certain components of the vibration waveform, such as magnitude and frequency can provide clues about whether a machine is operating normally or requires maintenance.

However, analysis of velocity and acceleration has not previously been considered in shaft-relative radial vibration analysis. More specifically, display of the distribution of velocity and acceleration of the shaft in relation to radial displacement is not available from any vibration analysis tools. This deficiency deprives the shaft-relative radial vibration analysis field of additional perspectives useful in understanding machine operation and diagnosis of issues.

Accordingly, a need exists for alternative systems and methods for collecting and displaying shaft-relative vibration data.

SUMMARY

In one embodiment, a method for processing rotating shaft-relative vibration data may include receiving shaft displacement data from a pair of sensors, wherein the shaft-displacement data includes shaft center X-axis displacement and shaft center Y-axis displacement, wherein the X-axis displacement and Y-axis displacement are orthogonal to each other. The method may further include converting the shaft displacement data to shaft velocity data by calculating a difference in shaft displacement over time. The converted shaft velocity data may be filtered, sorted, and grouped into three or more velocity groups. The method may further include assigning a color to each velocity group. The method further includes generating an image of a velocity orbit plot, where the X-axis displacement and the Y-axis displacement define coordinate pairs of a trace of shaft center displacement, and the velocity group between each coordinate pair defines a display color of the trace.

In another embodiment, the method for processing rotating shaft-relative vibration data may further include converting the shaft velocity data to shaft acceleration data by calculating a difference in shaft velocity over time, filtering the shaft acceleration data, sorting the shaft acceleration data from maximum to minimum, group the shaft acceleration data into three or more acceleration groups, assigning a color to each acceleration group, and generating an image of an acceleration orbit plot, where the X-axis displacement and Y-axis displacement define coordinate pairs of the trace of shaft center displacement, and the acceleration group between each coordinate pair defines a display color of the trace.

In an aspect of any of the above embodiments, the method may include simultaneously displaying an orbital plot of the shaft displacement data, the velocity orbit plot, and the acceleration orbit plot.

In another aspect of any of the above embodiments, the filtering of the shaft acceleration data comprises smoothing the shaft acceleration data using an exponential smoothing function.

In another aspect of any of the above embodiments, the filtering of the shaft velocity data comprises smoothing the shaft velocity data using an exponential smoothing function.

Other embodiments may include a computer readable medium storing instructions that, when executed by a processor, cause the processor to perform any of the disclosed embodiments, and a system including sensors and a processor and memory configured to execute any of the disclosed methods. These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
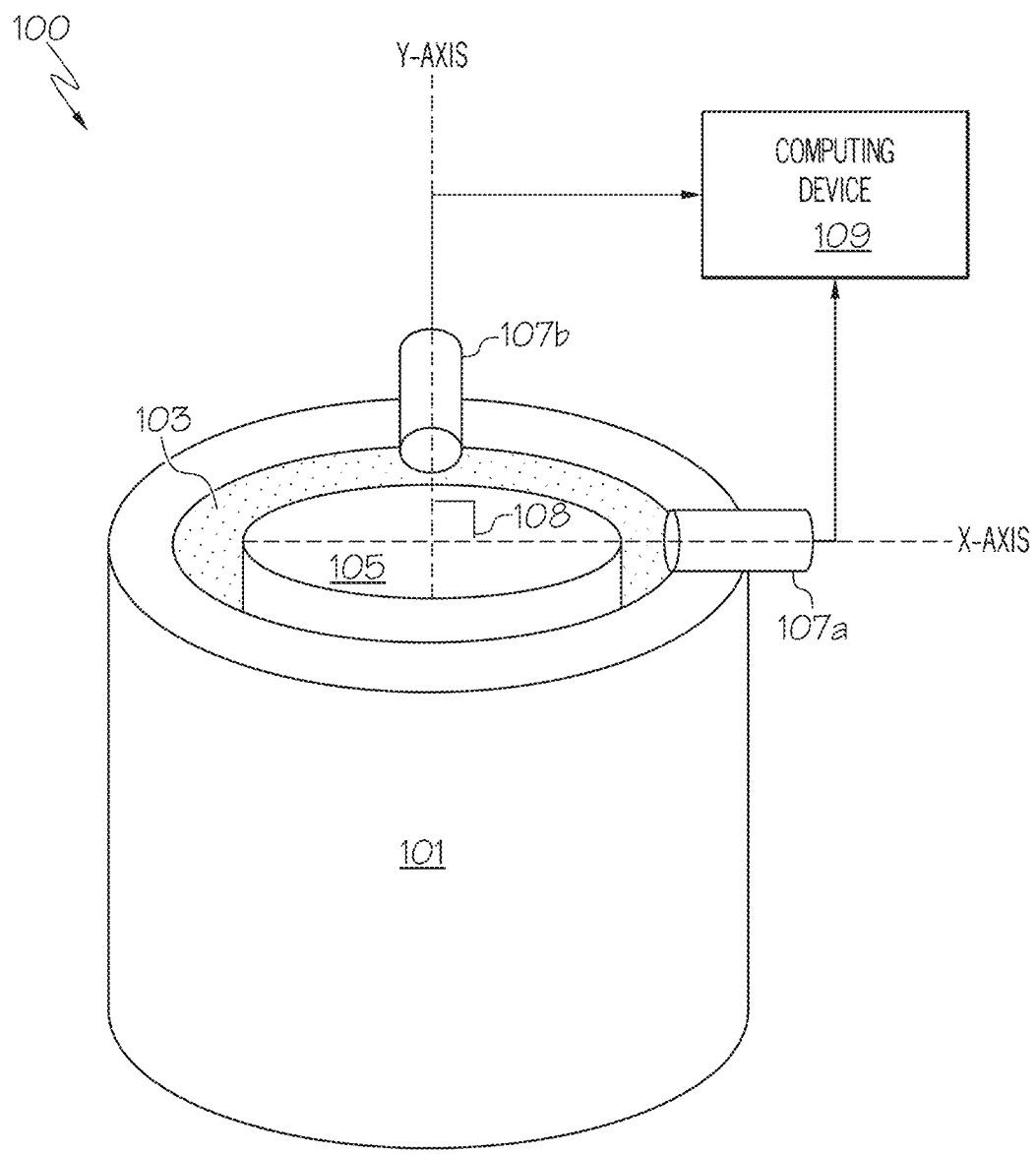
FIG. 1 depicts a cross-section diagram of a shaft assembly, illustrating sensor placement for measuring shaft-relative displacement within a casing according to one or more embodiments shown and described herein.

In the field of vibration analysis, vibration sensors typically measure vibration at a machine's casing or housing. Vibration analysis can be broadly broken down into three parameters: displacement, velocity, and acceleration. Typically, each of these parameters is analyzed and represented in the time domain or the frequency domain. Each of displacement, velocity, and acceleration is typically measured using different sensor types, from different locations of a machine, and used for diagnosing a different set of maintenance issues for the machine. Displacement is an indicator of stress, velocity is an indicator of fatigue, and acceleration is an indicator of force.

Because each parameter is suitable for diagnosing a different set of issues, displacement, velocity and acceleration are analyzed and interpreted independently of each other. Analyzing, for example, velocity with respect to displacement, for a particular sensor on a machine's housing, is nonsensical and provides no additional useful insights into the machine's operation. Therefore, analysis of the combination of, or relationship between, any two vibration parameters, from among displacement, velocity and acceleration, is not done in the field of vibration analysis. For this reason, until now, no attempt has been made to calculate and display shaft-relative radial vibration velocity and acceleration. In addition, there is no known plot of two spatial parameters that combines two vibration parameters, such as shaft-relative radial velocity and displacement or shaft-relative radial acceleration and displacement.

Shaft-relative radial vibration is vibration in a radial direction of the shaft, with respect to a bearing that holds the shaft. Throughout this specification, unless otherwise noted, the term "shaft-relative vibration" is understood to refer to shaft-relative radial vibration. Shaft-relative vibration is distinct from casing or housing vibration, as casing or housing vibration comprises a combination of a variety of different forces acting on the machine housing during operation. In a simple shaft-bearing-casing scenario, the result of the vector summation of shaft-relative vibration and casing or housing vibration is the shaft radial absolute vibration.

In the realm of shaft-relative vibration, although useful insight can be gained from independent evaluation of velocity and acceleration, additional insight can be gained from evaluating velocity or acceleration with respect to shaft displacement. This insight can be facilitated by displaying shaft displacement in a two-dimensional spatial domain, rather than the time domain or frequency domain. By indicating velocity or acceleration at every position of shaft displacement, a shaft's rubbing areas and the bearing's overloading forces can be visually indicated in relation to shaft displacement.

By combining velocity with displacement or acceleration with displacement in a single shaft orbital plot, the disclosed embodiments provide a vibration analysis tool that illuminates the relationships between shaft position and velocity and shaft position and acceleration. The disclosed embodiments also describe a suitable method of calculating vibration velocity and acceleration of the shaft center.

FIG. 1 schematically depicts a cross-section diagram of a shaft assembly 100, illustrating sensor placement for measuring shaft-relative displacement within the casing according to one or more embodiments shown and described herein. A casing 101 houses a rotatable shaft 105, which rotates relative to the casing 101. The shaft is typically held in place by a bearing (not shown), such as a journal bearing. A lubricating fluid 103 fills the space between the casing 101 and the shaft 105. Sensors 107a, 107b are fixed to the casing or the bearing and configured to measure the displacement of the shaft 105. The sensors 107a, 107b may be any sensors capable of measuring the displacement of the shaft 105 within the casing 101. These sensors 107a, 107b may measure the shaft 105 displacement directly, such as by measuring a distance between the sensor 107a, 107b and the shaft 105, or indirectly such as by measuring acceleration or velocity of the shaft 105 movement and converting to displacement. Suitable sensors are readily available and a person of ordinary skill in the art will understand the variety of sensors suitable for the embodiments disclosed herein.

The sensors 107a, 107b may comprise sensors configured to perform measurements rapidly and to transmit measurement data at sufficient speed to avoid transmit buffer overruns. The term "rapidly" in this context means at or above a Nyquist frequency corresponding to the highest frequency of vibration that the sensor 107a, 107b is specified to detect.

The sensors 107a, 107b are placed orthogonally 108 to each other, such that the output of a first sensor 107a corresponds to displacement on an X axis (X-axis displacement) and the output of a second sensor 107b corresponds to displacement on a Y axis (Y-axis displacement). The outputs of the first sensor 107a and the second sensor 107b are transmitted to a computing device 109. The computing device 109 is configured to receive measurement data from the sensors 107a, 107b at any speeds that the sensors 107a, 107b are configured to transmit. The computing device 109 is configured to perform one or more methods, as disclosed herein, to generate data corresponding to vibration displacement, vibration velocity, and vibration acceleration. The computing device 109 generates an image of a velocity orbit plot and/or an acceleration orbit plot, where the X-axis displacement and the Y-axis displacement define coordinate pairs of a trace of shaft center displacement, and the velocity or acceleration at each coordinate pair defines a display color of the trace. The computing device 109 may include a display device.

Figure 2:
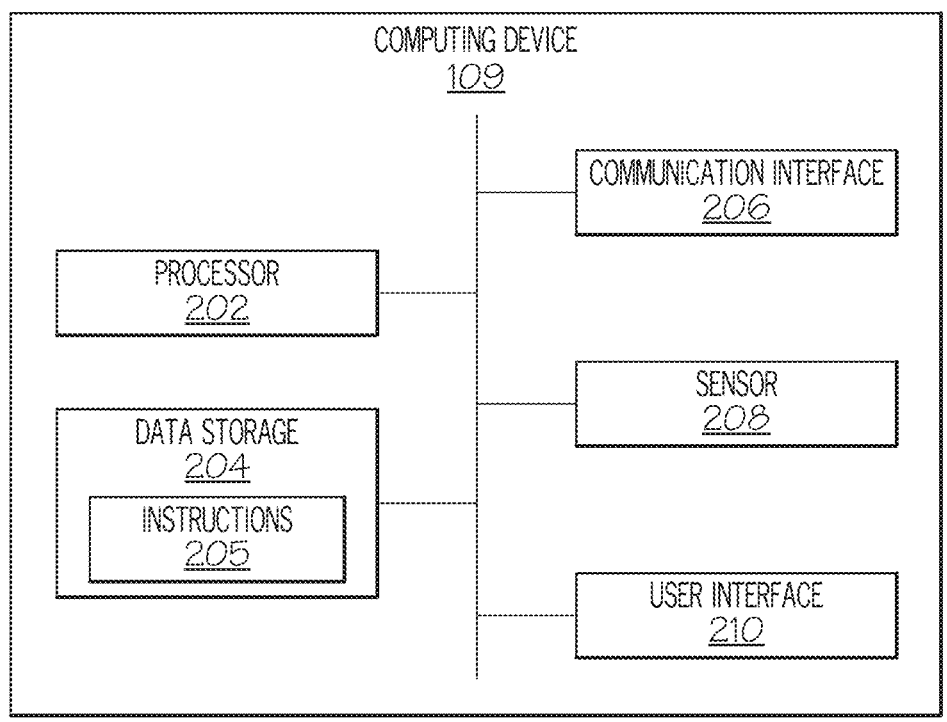
FIG. 2 depicts a block diagram of a computing device, according to one or more embodiments shown and described herein.

FIG. 2 depicts a block diagram of the computing device 109, according to one or more embodiments shown and described herein. As shown, a computing device 200 may include a processor 202, and data storage 204 including instructions 205. The computing device may further include a communication interface 206, a sensor 208, and a user interface 210, each of which are communicatively connected via a system bus 212. Any component or combination of components of the disclosed embodiments may take the form of or include a computing device 200. It should be understood that computing device 200 may include different and/or additional components, and some or all of the functions of a given component could instead be carried out by one or more different components. Computing device 200 may take the form of (or include) a virtual computing device or one or more computing resources in a cloud computing environment. Additionally, computing device 200 could take the form of (or include) a plurality of computing devices of any form, and some or all of the functions of a given component could be carried out by any combination of one or more of the computing devices in the plurality.

Processor 202 may take the form of one or more general-purpose processors and/or one or more special-purpose processors, and may be integrated in whole or in part with data storage 204, communication interface 206, sensor 208, user interface 210, and/or any other component of computing device 200, as examples. Accordingly, processor 202 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 204 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 205 may be stored in data storage 204, and may include machine-language instructions executable by processor 202 to cause computing device 200 to perform the computing-device functions described herein. Additionally or alternatively, instructions 205 may include script instructions executable by a script interpreter configured to cause processor 202 and computing device 200 to execute the instructions specified in the script instructions. According to some embodiments, the instructions include instructions executable by the processor to cause the computing device to execute an artificial neural network. It should be understood that instructions 205 may take other forms as well.

Additional data may be stored in data storage 204, such as databases, data structures, data lakes, and/or network parameters of a neural network. The additional data could be stored such as a table, a flat file, data in a file system of the data storage, a heap file, a B+ tree, a hash table, a hash bucket, or any combination of these, as examples.

Communication interface 206 may be any component capable of performing the communication-interface functions described herein, including facilitating wired and/or wireless communication between computing device 200 and another entity. As such, communication interface 206 could take the form of an Ethernet, Wi-Fi, Bluetooth, and/or USB interface, among many other examples. Communication interface 206 may receive data over a network via communication links, for instance.

Sensor 208 could take the form of one or more sensors operable to perform any of the sensor functions described herein. The sensor could be positioned on a machine. Though sensor 208 may be referenced in the singular throughout this disclosure, it should be understood that sensor 208 may take the form of (or include) a single sensor or multiple sensors.

User interface 210 may be any component capable of carrying out the user-interface functions described herein. For example, the user interface may be configured to receive input from a user and/or output information to the user. Output may be provided via a computer monitor, a loudspeaker (such as a computer speaker), or another component of (or communicatively linked to) computing device 200. User input might be achieved via a keyboard, a mouse, or other component communicatively linked to the computing device. As another possibility, input may be realized via a touchscreen display of the computing device in the form of a smartphone or tablet device. Some components may provide for both input and output, such as the aforementioned touchscreen display. It should be understood that user interface 210 may take numerous other forms as well.

System bus 212 may be any component capable of performing the system-bus functions described herein. In an embodiment, system bus 212 is any component configured to transfer data between processor 202, data storage 204, communication interface 206, sensor 208, user interface 210, and/or any other component of computing device 200. In an embodiment, system bus 212 includes a traditional bus as is known in the art. In other embodiments, system bus 212 includes a serial RS-232 communication link, a USB communication link, and/or an Ethernet communication link, alone or in combination with a traditional computer bus, among numerous other possibilities. In some examples, system bus 212 may be formed from any medium that is capable of transmitting a signal, such as conductive wires, conductive traces, or optical waveguides, among other possibilities. Moreover, system bus 212 may be formed from a combination of mediums capable of transmitting signals. The system bus could take the form of (or include) an industrial equipment communications bus, such as a local interconnect network (LIN) bus, a controller area network (CAN) bus, a vehicle area network (VAN) bus, or any combination of these or mediums. It should be understood that system bus 212 may take various other forms as well.

In the disclosed embodiments, a network may include one or more computer networks (e.g., a personal area network, a local area network, grid computing network, wide area network, etc.), cellular networks, satellite networks, the internet, a virtual network in a cloud computing environment, and/or any combinations thereof. Accordingly, the components of the system 100 may be communicatively coupled to the network via a wide area network, via a local area network, via a personal area network, via a cellular network, via a satellite network, via a cloud network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB, Serial ATA, eSATA, and FireWire. Suitable cellular networks include, but are not limited to, technologies such as LTE, WiMAX, UMTS, CDMA, and GSM. Accordingly, the network can be utilized as a wireless access point by the system 100 to access one or more servers.

Figure 3:
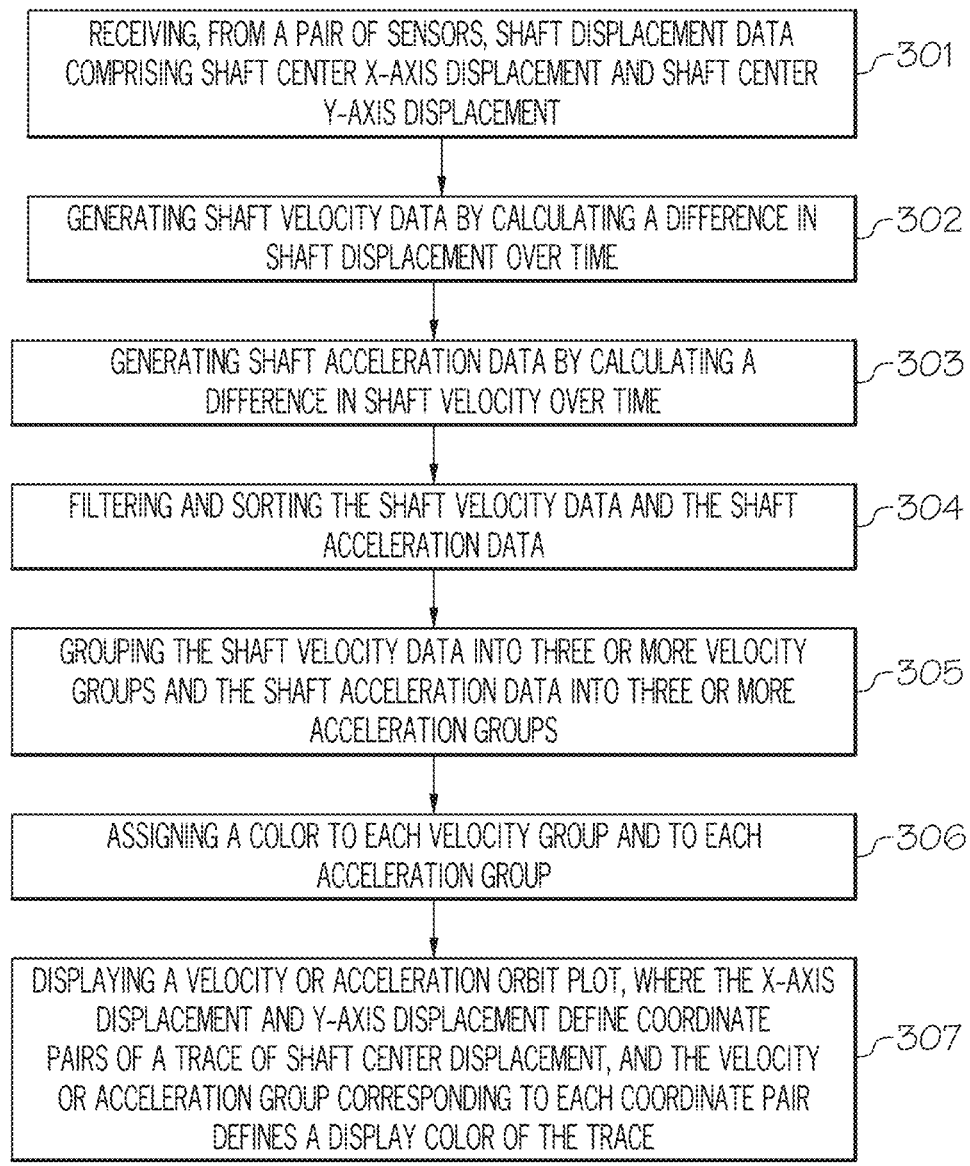
FIG. 3 depicts a flow chart of a method for collecting, processing, and displaying shaft-relative vibration displacement, velocity, and acceleration according to one or more embodiments shown and described herein.

FIG. 3 depicts a flow chart of a method for collecting, processing, and displaying shaft-relative vibration displacement, velocity, and acceleration according to one or more embodiments shown and described herein. At step 301, the computing device 109 receives shaft displacement data from a pair of sensors 107a, 107b. The shaft displacement data may comprise shaft center X-axis displacement and shaft center Y-axis displacement. The shaft displacement data may comprise raw output data from the sensors 107a, 107b. The computing device 109 may be configured to translate the any output data from the sensors 107a, 107b into shaft 105 center X-axis displacement and shaft 105 center Y-axis displacement by mathematical integration, derivation, transformation, and/or addition of a bias, such as a specified diameter of the shaft 105.

Because sensor 107a, 107b data is collected rapidly, differences in a rotating vibrating shaft's position from one measurement to the next are sufficiently infinitesimal as to allow reconstruction of the shaft's position over time without introducing aliasing errors. This frequency of measurements allows velocity to be calculated as an average velocity between consecutive measurements of displacement without unacceptable loss of accuracy.

At step 302, the computing device 109 may generate shaft velocity data by calculating a difference in shaft displacement over time. The difference in shaft displacement over time may comprise an X-axis difference over time and a Y-axis difference over time. The difference in shaft displacement may be calculated using the Pythagorean theorem with respect to the X-axis displacement and the Y-axis displacement. Shaft velocity may be calculated according to the following formula:

$$v_n = \frac{\sqrt{[(x_n - x_{n-1})^2 + (y_n - y_{n-1})^2]}}{\Delta t}$$

Where $x_n$ represents shaft displacement measurement on the X-axis and $y_n$ represents shaft displacement measurement on the Y-axis. Alternatively, shaft velocity data may be generated by integration of acceleration data, or the sensors 107a, 107b may be configured to transmit velocity data.

At step 303, the computing device 109 may generate shaft acceleration data by calculating a difference in shaft velocity over time. Shaft acceleration may be calculated according to the following formula:

$$a_n = \frac{v_n - v_{n-1}}{\Delta t}$$

Alternatively, the sensors 107a, 107b may be configured to transmit acceleration data.

As step 304, the computing device 109 filters and sorts the shaft velocity data and the shaft acceleration data. Because the displacement data is discrete, the resulting velocity and acceleration data are also discrete. This can produce high frequency noise in the resulting dataset. The noise in the velocity and acceleration data may be filtered using an exponential function. The velocity and acceleration data may also be filtered using any low-pass filter. In some embodiments, an anti-aliasing filter may be used to avoid alias frequencies.

The velocity and acceleration data may also be sorted from maximum to minimum or from minimum to maximum. The purpose of sorting is to group similar values and to identify the range of values in the filtered shaft velocity data and shaft acceleration data. A person of ordinary skill in the art will understand that alternative methods exist for accomplishing these purposes and, therefore, sorting is not a critical step and the disclosed embodiments are not intended to be limited to just sorting in order to determine the range of values and group similar values.

At step 305, shaft velocity data and shaft acceleration data are each grouped. The shaft velocity data and shaft acceleration data may be grouped into three or more groups. According to some embodiments, the velocity data and shaft acceleration data are each grouped into nine groups. At step 306, each shaft velocity group and each shaft acceleration group is assigned a color (color groups). Each shaft velocity group may be assigned a different color. The same colors may also be used for the shaft acceleration groups and each shaft acceleration group may be assigned a different color. According to some embodiments, color groups may be created by identifying a range of the velocity data or acceleration data being grouped. The range may be evenly divided into color groups of substantially equal size. Substantially equal means each color group has a range size within one or two whole numbers of each other color group. Alternatively, color groups may be created by dividing the velocity data or acceleration data into groups with a substantially equal number of measurements in each color group. This alternative approach may be advantageous because it creates a higher color resolution in ranges where a greater number of measurements of velocity data or acceleration data happen to fall.

At step 307, the computing device 109 generates an image of a velocity orbit plot and/or acceleration orbit plot. The velocity orbit plot image is generated by using the X-axis displacement and the Y-axis displacement and a color assigned to the velocity groups. The X-axis displacement and Y-axis displacement define coordinate pairs of a trace of shaft center displacement, and the shaft velocity group between each coordinate pair defines a display color of the trace. This produces a Lissajous plot of the shaft displacement on a 2-dimensional spatial coordinate plane with a display color at each segment of the Lissajous plot corresponding to the velocity of the shaft, as determined according to any of the embodiments disclosed herein.

The acceleration orbit plot is generated similarly to the velocity orbit plot. The X-axis displacement and the Y-axis displacement define a trace of the Lissajous plot while the color between each (X, Y) coordinate pair is determined by the color assigned to the acceleration group. This produces a Lissajous plot of the shaft displacement on a 2-dimensional spatial coordinate plane with a display color at each segment of the Lissajous plot corresponding to the acceleration of the shaft, as determined according to any of the embodiments disclosed herein. Non-limiting example shaft displacement, shaft velocity, and shaft acceleration plots are shown in FIG. 4.

Figure 4:
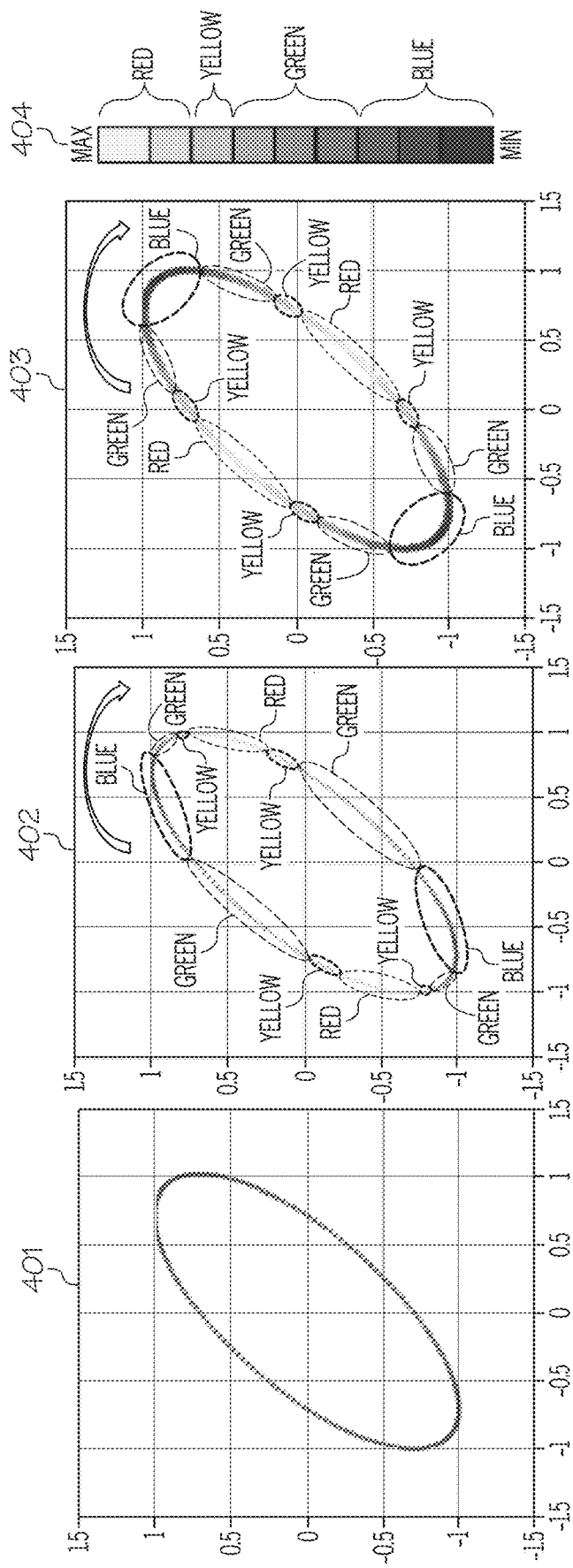
FIG. 4 depicts example Lissajous plots of shaft center displacement, shaft-relative vibration velocity, and shaft-relative vibration acceleration according to one or more embodiments shown and described herein.

FIG. 4 depicts example Lissajous plots of shaft center displacement, shaft-relative vibration velocity, and shaft-relative vibration acceleration according to one or more embodiments shown and described herein. According to some embodiments, the computing device may generate and simultaneously display a shaft displacement plot 401, a shaft velocity plot 402, a shaft acceleration plot 403, or any two or more of the shaft displacement plot 401, the shaft velocity plot 402, and shaft acceleration plot 403. The computing device 109 may also display a color key 404, indicating the colors assigned to each velocity group or each acceleration group. A direction of shaft center movement may be indicated by an arrow 405 on one or more of the plots 401, 402, 403.

The example shaft center displacement plot 401, shaft velocity plot 402, and shaft acceleration plot 403 are illustrative only and not intended to be exhaustive or limiting. According to FIG. 4, a maximum area of shaft center velocity or acceleration may be indicated by a segment of red trace. A minimum area of shaft center velocity or acceleration may be indicated by a segment of blue trace. Now referring to the shaft velocity plot 402 and the shaft acceleration plot 403 in FIG. 4, the velocity with respect to position and acceleration with respect to position graphically display locations where the shaft and bearing system is experiencing problems, and what types of problems are being experienced. The color coded shaft velocity plot 401 and shaft acceleration plot may indicate rubbing, misalignment, pad interference, or bearing damage through display of different colors representing different velocity or acceleration with respect to shaft center displacement. Other problems such as improper lubrication, torsional stress, resonance, shaft bend, and the like can also be detected and analyzed. As examples, very low acceleration and velocity are normally associated with rubbing, high acceleration with overload forces, and high velocity with unbalance.

Figure 5B:
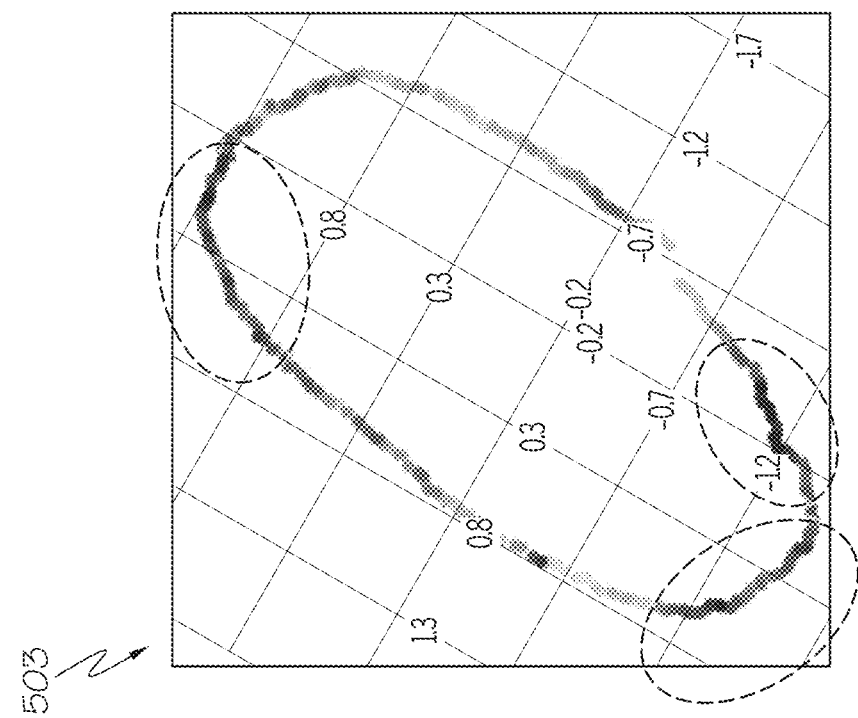
FIG. 5B depicts an example Lissajous plot of shaft acceleration for the compressor shaft of FIG. 5B prior to repair according to one or more embodiments shown and described herein.
Figure 5A:
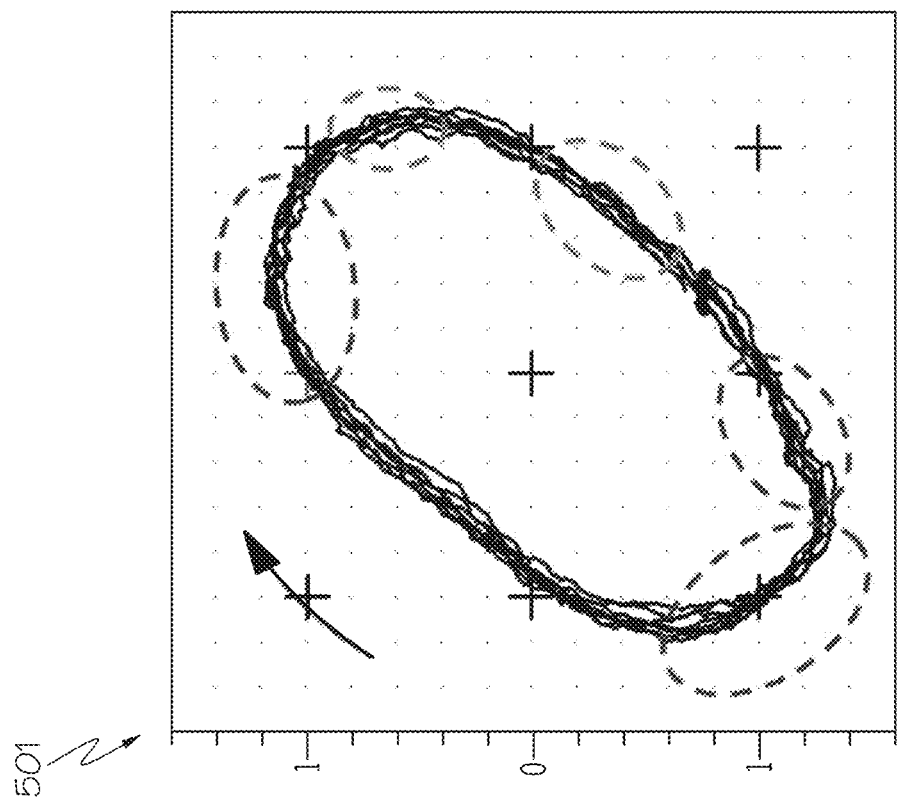
FIG. 5A depicts an example Lissajous plot of shaft center displacement for a compressor shaft prior to repair according to one or more embodiments shown and described herein.

Every rotating machine type has its own particularities and thus unique issues. However, the main mechanical issues are common and the plots of embodiments of the present disclosure indicate that these issues are similar. FIGS. 5A and 5B illustrate a shaft center displacement plot 501 and a shaft acceleration plot 503, respectively, of a compressor shaft exhibiting vibration before repair. The shaft-relative vibration was considered high so a decision was made to have the compressor shaft overhauled.

The shaft acceleration plot 503 of FIG. 5B shows three levels of blue where the acceleration was negative (indicated by the dashed ovals). The negative acceleration is indicative of possible rubbing. The areas of negative acceleration are also indicated on the shaft center displacement plot 501 of FIG. 5A. The range of estimated acceleration was −0.37 g to 0.42 g. The vibration level of 2.8 mil.

Figure 6B:
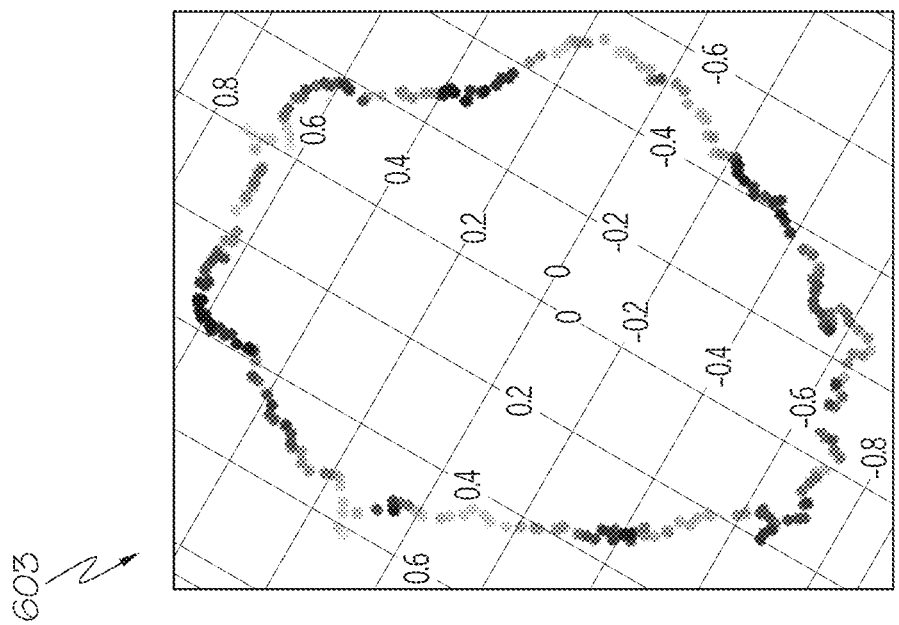
FIG. 6B depicts an example Lissajous plot of shaft acceleration for the compressor shaft of FIG. 5B after to repair according to one or more embodiments shown and described herein.
Figure 6A:
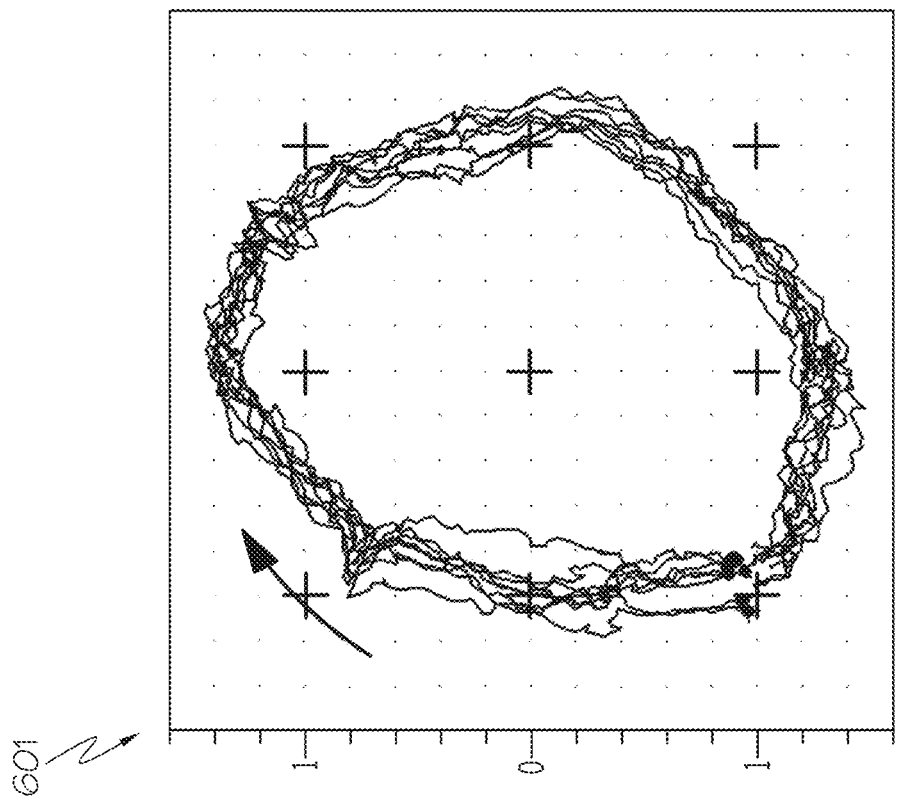
FIG. 6A depicts an example Lissajous plot of shaft center displacement for the compressor shaft of FIG. 5A after repair according to one or more embodiments shown and described herein.

FIGS. 6A and 6B are a shaft center displacement plot 601 and a shaft acceleration plot 603, respectively, of the same compressor shaft as FIGS. 5A and 5B but after repair. A comparison of shaft acceleration plot 503 prior to repair to the shaft acceleration plot 603 after repair shows that the blue areas of negative acceleration have been reduced. The new range of estimated acceleration was −0.24 g to 0.27 g, which represented a drop of 35% in both positive and negative acceleration as compared to the compressor shaft prior to repair. Additionally, the vibration level dropped from 2.8 mil pp prior to repair to 1.4 mil pp after repair.

In should now be understood that the disclosed embodiments provide a novel analysis tool for vibration analysis in rotating shaft and bearing systems. These images are presented in a 2-dimensional spatial domain rather than a time or frequency domain, enabling display of specific locations, relative to the sensors, where maintenance issues may exist. Present time domain and frequency domain plots are unable to indicate a location of a maintenance issue because the spatial domains are excluded from the display.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for processing rotating shaft-relative vibration data, the method comprising:
    measuring shaft displacement data with a pair of sensors, wherein the shaft-displacement data comprises shaft center X-axis displacement and shaft center Y-axis displacement, wherein the X-axis displacement and Y-axis displacement are orthogonal to each other;
    converting the shaft displacement data to shaft velocity data by calculating a difference in shaft displacement over time;
    filtering the shaft velocity data;
    sorting the shaft velocity data;
    grouping the shaft velocity data into three or more velocity groups;
    assigning a different color to each velocity group; and
    displaying an image of a velocity orbit plot on an electronic display, where the X-axis displacement and the Y-axis displacement define coordinate pairs of a trace of shaft center displacement, and the velocity group between each coordinate pair defines a display color of the trace.

2. The method of claim 1, further comprising:
    converting the shaft velocity data to shaft acceleration data by calculating a difference in shaft velocity over time;
    filtering the shaft acceleration data;
    sorting the shaft acceleration data;
    grouping the shaft acceleration data into three or more acceleration groups;
    assigning a different color to each acceleration group; and
    generating an image of an acceleration orbit plot, where the X-axis displacement and Y-axis displacement define coordinate pairs of the trace of shaft center displacement, and the acceleration group between each coordinate pair defines a display color of the trace.

3. The method of claim 2, further comprising:
    simultaneously displaying an orbital plot of the shaft displacement data, the velocity orbit plot, and the acceleration orbit plot.

4. The method of claim 2, wherein the filtering of the shaft acceleration data comprises smoothing the shaft acceleration data using an exponential smoothing function.

5. The method of claim 1, wherein the filtering of the shaft velocity data comprises smoothing the shaft velocity data using an exponential smoothing function.

6. A non-transitory computer-readable storage medium storing instructions that, when executed by a processor, cause the processor to perform steps of:
    measuring shaft displacement data with a pair of sensors, wherein the shaft-displacement data comprises shaft center X-axis displacement and shaft center Y-axis displacement, wherein the X-axis displacement and Y-axis displacement are orthogonal to each other;
    converting the shaft displacement data to shaft velocity data by calculating a difference in shaft displacement over time;
    filtering the shaft velocity data;
    sorting the shaft velocity data;
    grouping the shaft velocity data into three or more velocity groups;
    assigning a different color to each velocity group; and
    displaying an image of a velocity orbit plot on an electronic display, where the X-axis displacement and Y-axis displacement define coordinate pairs of a trace of shaft center displacement, and the velocity group between each coordinate pair defines a display color of the trace.

7. The computer-readable medium of claim 6 storing further instructions that, when executed by the processor, cause the processor to further perform steps of:
    converting the shaft velocity data to shaft acceleration data by calculating a difference in shaft velocity over time;
    filtering the shaft acceleration data;
    sorting the shaft acceleration data;
    grouping the shaft acceleration data into three or more acceleration groups;
    assigning a different color to each acceleration group; and
    generating an image of an acceleration orbit plot, where the X-axis displacement and Y-axis displacement define coordinate pairs of the trace of shaft center displacement, and the acceleration group between each coordinate pair defines a display color of the trace.

8. The computer-readable medium of claim 7 storing further instructions that, when executed by the processor, cause the processor to further perform steps of:
    simultaneously displaying an orbital plot of the shaft displacement data, the velocity orbit plot, and the acceleration orbit plot.

9. The computer-readable medium of claim 7, wherein the filtering of the shaft acceleration data comprises smoothing the shaft acceleration data using an exponential smoothing function.

10. The computer-readable medium of claim 6, wherein the filtering of the shaft velocity data comprises smoothing the shaft velocity data using an exponential smoothing function.

11. A system comprising:
a rotatable shaft;
a casing;
one or more journal bearings supporting the rotatable shaft within the casing;
two displacement sensors, comprising an X-axis displacement sensor and a Y-axis displacement sensor, attached to the casing and positioned orthogonally to each other on a plane transverse to a rotation axis of the rotatable shaft;
a processor and memory communicatively connected to the two displacement sensors and configured to perform steps of:
receiving shaft displacement data from a pair of sensors, wherein the shaft-displacement data comprises shaft center X-axis displacement and shaft center Y-axis displacement, wherein the X-axis displacement and Y-axis displacement are orthogonal to each other;
converting the shaft displacement data to shaft velocity data by calculating a difference in shaft displacement over time;
filtering the shaft velocity data;
sorting the shaft velocity data;
grouping the shaft velocity data into three or more velocity groups;
assigning a different color to each velocity group; and
display an image of a velocity orbit plot, where the X-axis displacement and Y-axis displacement define coordinate pairs of a trace of shaft center displacement, and the velocity group between each coordinate pair defines a display color of the trace.

12. The system of claim 11, wherein the processor and memory are further configured to perform steps of:
converting the shaft velocity data to shaft acceleration data by calculating a difference in shaft velocity over time;
filtering the shaft acceleration data;
sorting the shaft acceleration data;
grouping the shaft acceleration data into three or more acceleration groups;
assigning a different color to each acceleration group; and
generating an image of an acceleration orbit plot, where the X-axis displacement and Y-axis displacement define coordinate pairs of the trace of shaft center displacement, and the acceleration group between each coordinate pair defines a display color of the trace.

13. The system of claim 12, wherein the processor and memory are further configured to perform steps of:
simultaneously displaying an orbital plot of the shaft displacement data, the velocity orbit plot, and the acceleration orbit plot.

14. The system of claim 12, wherein the filtering of the shaft acceleration data comprises smoothing the shaft acceleration data using an exponential smoothing function.

15. The system of claim 11, wherein the filtering of the shaft velocity data comprises smoothing the shaft velocity data using an exponential smoothing function.

* * * * *